(12) United States Patent
Wada

(10) Patent No.: US 8,507,794 B2
(45) Date of Patent: Aug. 13, 2013

(54) CLIP AND WIRE HARNESS EQUIPPED WITH CLIP

(75) Inventor: Tetsuaki Wada, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 13/325,366

(22) Filed: Dec. 14, 2011

(65) Prior Publication Data

US 2012/0267166 A1 Oct. 25, 2012

(30) Foreign Application Priority Data

Apr. 25, 2011 (JP) ................................. 2011-097008

(51) Int. Cl.
*H02G 3/04* (2006.01)
(52) U.S. Cl.
USPC ..... 174/72 A; 174/135; 174/138 G; 248/68.1; 248/74.2
(58) Field of Classification Search
USPC ............ 174/72 A, 68.1, 40 CC, 72 TR, 74 R, 174/481, 135; 248/73, 68.1, 71, 74.2, 74.4, 248/74.1, 49, 62
See application file for complete search history.

(56) References Cited

U.S. PATENT DOCUMENTS

| | | | | |
|---|---|---|---|---|
| 5,209,441 A * | 5/1993 | Satoh | ............................. | 248/74.2 |
| 5,535,969 A * | 7/1996 | Duffy, Jr. | ...................... | 248/68.1 |
| 5,575,969 A | 11/1996 | Yamamori et al. | | |
| 5,765,787 A * | 6/1998 | de Beers et al. | ............. | 248/74.2 |
| 5,820,048 A * | 10/1998 | Shereyk et al. | .............. | 248/68.1 |
| 5,906,342 A * | 5/1999 | Kraus | .......................... | 248/74.1 |
| 6,371,419 B1 * | 4/2002 | Ohnuki | ......................... | 248/74.2 |
| 6,499,702 B2 | 12/2002 | Kamekawa | | |
| 6,504,101 B2 | 1/2003 | Kondoh | | |
| 6,641,093 B2 * | 11/2003 | Coudrais | ........................ | 248/68.1 |
| 6,809,257 B2 * | 10/2004 | Shibuya | ......................... | 174/481 |
| 7,559,511 B2 * | 7/2009 | Yon | ................................. | 248/68.1 |
| 8,157,222 B1 * | 4/2012 | Shirey et al. | .................. | 248/74.1 |

FOREIGN PATENT DOCUMENTS

| | | |
|---|---|---|
| JP | 53-134398 | 12/1978 |
| JP | 53-154398 | 12/1978 |
| JP | 64-6482 | 1/1989 |
| JP | 11-344157 | 12/1999 |

* cited by examiner

*Primary Examiner* — Angel R Estrada
(74) *Attorney, Agent, or Firm* — Greenblum & Bernstein P.L.C.

(57) ABSTRACT

A clip and a wire harness equipped with a clip are provided that can restrain the clip from readily falling down from an electrical wire bundle, can be easily mounted on the bundle, and can reduce a protruding amount of the clip from the bundle to as small as possible. A clip includes an inserting section to be inserted into an attaching hole in a vehicle body, and a holding section for holding an electrical wire bundle. The holding section includes a projection portion that protrudes from the inserting section, and distal end spreading portions that spread from a distal end of the projection portion toward spaces at opposite sides of the projection portion. The distal end spreading portions are curved in convex shapes in a distal end direction of the projection portion as a whole.

7 Claims, 3 Drawing Sheets

CLIP AND WIRE HARNESS EQUIPPED WITH CLIP

CROSS-REFERENCE TO RELATED APPLICATIONS

The present application claims priority under 35 U.S. §119 of Japanese Application No. 2011-097008, filed on Apr. 25, 2011, the disclosure of which is expressly incorporated by reference herein in its entirety.

TECHNICAL FIELD

This invention relates to a clip and a wire harness equipped with a clip.

BACKGROUND ART

Various kinds of techniques for securing a wire harness to a vehicle body have been adopted in a vehicle such as a motor vehicle.

JUM SHO 64(1989)-6482 A discloses an integrally molded clamp in which a latch section to be fixed on a vehicle protrudes from a central part of a rectangular plate-like fixing section. The fixing section is mounted on an outer periphery of a wire harness by means of winding a tape. However, such structure cannot exert a sufficient mounting and holding force between the wire harness and the clamp. For this reason, JUM SHO 64(1989)-6482 A discloses a structure in which the fixing section is disposed in an electrical wire bundle.

JP HEI 11(1999)-344157 A discloses a harness-securing section in which a clip body section is provided between a pair of parallel plates for restraining a harness from overflowing out of the clip. After the harness-securing section is inserted into a clearance defined by approximately dividing a harness bundle into halves, a tape is wound around a wire harness, thereby fixing the harness-securing section onto the wire harness.

JUM SHO 53(1978)-154398 A discloses a structure for holding an electrical wire bundle. In this structure, a holding section having an arrow-tail-like configuration is inserted into an electrical wire bundle to hold the electrical wire bundle.

However, in the clips disclosed in JUM SHO 64(1989)-6482 A and JP HEI 11(1999)-344157 A, parts of the clips to be embedded in the electrical wire bundle are formed into flat plate-like configurations. For this reason, it is difficult to embed the clip in the electrical wire bundle, and it will be a hard work to attach the clip to the electrical wire bundle.

Furthermore, in the clip disclosed in JUM SHO 53(1978)-154398 A, an outer periphery of a distal end of the clip to be inserted into the electrical wire bundle is formed into the arrow-tail-configuration. Thus, a part of the distal end of the clip protrudes outward sharply. This will cause a problem of blocking an arranging work of the wire harness on a vehicle.

DISCLOSURE OF THE INVENTION

In view of the above problems, an object of the present invention is to provide a clip and a wire harness equipped with a clip that can restrain the clip from readily falling down from an electrical wire bundle, can be easily mounted on the bundle, and can reduce a protruding amount of the clip from the bundle to as small as possible.

Means for Solving the Problems

In order to solve the above problems, a first aspect of the present invention is directed to a clip including a fixing section to be secured to a vehicle body and a holding section for holding an electrical wire bundle. The fixing section includes: a projection portion that protrudes from the fixing section; and distal end spreading portions that extend from a distal end of the projection portion toward spaces at opposite sides of the projection portion and that are curved in convex shapes in a distal end direction of the projection portion as a whole.

A second aspect of the present invention is directed to the clip according to the first aspect. The holding section includes proximal end spreading portions that spread from a proximal end of the projection portion at the opposite sides of the projection portion.

A third aspect of the present invention is directed to the clip according to the second aspect. The proximal end spreading portions are curved in convex shapes in a direction toward the fixing section.

A fourth aspect of the present invention is directed to the clip according to any one of the first to third aspects. The distal end spreading portions spread in the same curved shapes at the opposite sides of the projection portion.

A fifth aspect of the present invention is directed to a wire harness equipped with a clip that comprises: a wire harness including an electrical wire bundle that binds a plurality of electrical wires; and a clip mounted on the electrical wire bundle and according to any one of the first to fourth aspects.

A sixth aspect of the present invention is directed to the wire harness equipped with a clip, according to the fifth aspect. An extending direction of the electrical wire bundle is perpendicular to a spreading direction of the distal end spreading portions. The distal end spreading portions are embedded in the electrical wire bundle, or the distal end spreading portions contact with an outer periphery of the electrical wire bundle.

Effects of the Invention

According to the inventions specified in the first to fourth aspects, since the distal end spreading portions are curved in the convex shapes in the distal end direction of the projection portion as a whole, the clip can be easily pushed into and mounted onto the electrical wire bundle. When the holding section is pushed into the electrical wire bundle, it is possible to restrain the clip from falling down from the electrical wire bundle, since the distal end spreading portions are caught by the electrical wire bundle. Since the distal end spreading portions are curved in the convex shapes in the distal end direction of the projection portion as a whole, it is possible to arrange the distal end spreading portions along the outer periphery of the electrical wire bundle, even if the distal end spreading portions protrude from the outer periphery of the electrical wire bundle. Thus, it is possible to reduce the protruding amount of the distal end spreading portions from the electrical wire bundle to as small as possible.

In particular, according to the invention specified in the second aspect, since the holding section includes the proximal end spreading portions, it is possible to restrain the electrical wire bundle held by the holding section from shifting from the holding section toward the fixing section.

In particular, according to the invention specified in the third aspect, the proximal end spreading portions are curved in the convex shapes in the direction toward the fixing section. Thus, it is possible to reduce a protruding amount of the clip from the electrical wire bundle to as small as possible.

In particular, according to the invention specified in the fourth aspect, the distal end spreading portions spread at the opposite sides of the projection portion to define the same curved shapes. Accordingly, since the holding section has a good balance with respect to the projection portion, it is possible for the distal end spreading portions to stably support the divided electrical wire bundle at the opposite sides of the projection portion. Accordingly, the electrical wire bundle will hardly come out from the clip.

According to the inventions specified in the fifth and sixth aspects, since the distal end spreading portions, which include the holding section of the clip mounted on the wire harness, are curved in the convex shapes in the distal end direction of the projection portion as a whole, the clip can be easily pushed into and can be mounted onto the electrical wire bundle. When the holding section is pushed into the electrical wire bundle, it is possible to restrain the clip from falling down from the electrical wire bundle, since the distal end spreading portions are caught by the electrical wire bundle. Since the distal end spreading portions are curved in the convex shapes in the distal end direction of the projection portion as a whole, it is possible to arrange the distal end spreading portions along the outer periphery of the electrical wire bundle, even if the distal end spreading portions protrude from the outer periphery of the electrical wire bundle. Thus, it is possible to reduce the protruding amount of the distal end spreading portions from the electrical wire bundle to as small as possible.

BRIEF EXPLANATION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

PREFERRED ASPECTS OF EMBODYING THE INVENTION

Figure 1:
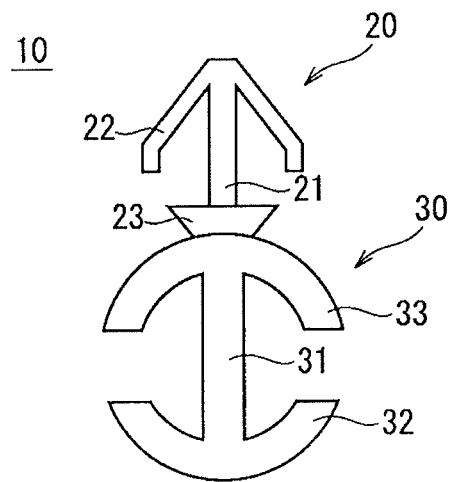
FIG. 1 is a side elevation view of an embodiment of a clip in accordance with the present invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Referring now to the drawings, embodiments of a clip and a wire harness equipped with a clip in accordance with the present invention will be described below. It should be noted that the embodiments described below are examples embodying the present invention and the embodiments do not limit a technical scope of the present invention.

Figure 2:
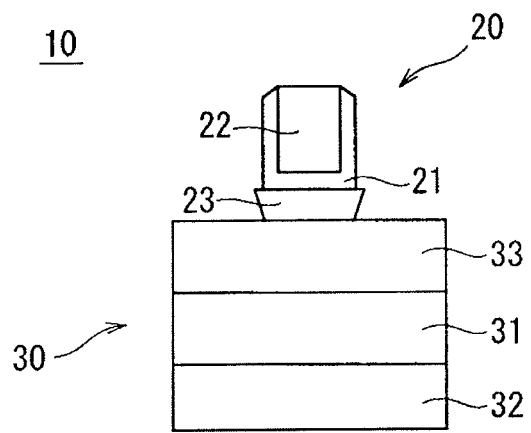
FIG. 2 is a front elevation view of an embodiment of a clip in accordance with the present invention.

FIG. 1 shows a side elevation view of an embodiment of a clip 10 in accordance with the present invention. FIG. 2 shows a front elevation view of the embodiment of the clip 10. When the clip 10 is inserted into a mounting hole 90 (see FIGS. 3 and 5) formed in a vehicle body, such as a vehicle frame or a vehicle panel, the clip 10 is supported on an edge around the mounting hole 90.

The clip 10 has a structure that is made of any suitable material, such as a resin material, and integrates an inserting section 20 to be inserted into the mounting hole 90 and a holding section 30 that holds an electrical wire bundle 51 that constitutes a wire harness 50a equipped with a clip. The inserting section 20 corresponds to a fixing section in the present embodiment.

The inserting section 20 includes a stick-like axial portion 21, a pair of attaching pieces 22 that spread gradually outward from a distal end of the axial portion 21 toward a proximal end of the axial portion 21, and a dish-like receiving portion 23 provided on a peripheral part of the proximal end of the axial portion 21.

When the inserting section 20 is inserted into the mounting hole 90 in the vehicle body, the attaching pieces 22 deflect and contract their free ends so that the distal ends of the attaching pieces 22 are caught on the edge around the mounting hole 90. Thus, the attaching pieces 22 and receiving portion 23 pinch a support member 70 around the mounting hole 90 at front and rear sides of the support member 70, thereby fixing the inserting section 20 to the support member 70. Alternatively, a plurality of recesses may be provided on outsides of the distal ends of the attaching pieces 22 and the plural recesses may be selectively caught on the mounting hole 90.

It should be noted that the inserting section 20 is not limited to the structure shown in FIG. 1. For example, a pair of axial portions may protrude from a central part of the receiving portion and may be spaced apart from each other by a given distance, and a projection portion may be provided on each of the pair of axial portions. In this case, when the pair of axial portions are elastically deflected in a direction in which the pair of axial portions approach each other, the projection portions on the distal ends of the axial portions pass through the mounting hole 90 and are latched in the mounting hole 90. However, the inserting section may not be provided with the receiving portion and may include an axial portion that extends in a given axial direction and a plurality of annular projections that are provided on an outer peripheral surface of the axial portion and are spaced apart from one another in an axial direction.

The holding section 30 is made of any suitable material, such as a resin material, and includes a projection portion 31, a pair of distal end spreading portions 32, and a pair of proximal end spreading portions 33.

The projection portion 31 is a stick-like member (a rectangular plate-like member in the drawings) that protrudes from the receiving portion 23 in a direction opposite from the axial portion 21. The projection portion 31 is connected to the receiving portion 23 so that a thickness direction of the projection portion 31 is perpendicular to an axial direction of the axial portion 21. It is preferable that a length of a projection portion 31 in its protruding direction is set to be substantially same as or smaller than a diameter of the electrical wire bundle 51 to be held in the holding section 30.

As shown in FIG. 1, the distal end spreading portions 32 spread from a distal end of the projection portion 31 toward spaces at opposite sides of the projection portion 31 (more specifically, spaces at opposite rectangular sides of the projection portion 31). The distal end spreading portions 32 are curved in convex shapes in a distal end direction of the projection portion 31 as a whole. That is, the distal end spreading portions 32 define a uniform radius of curvature in their spreading directions as a whole. More specifically, the distal end spreading portions 32 are formed into an arcuate shape having the same radius of curvature as the diameter of the electrical wire bundle 51. Further, if there are a plurality of diameters of the electrical wire bundles 51 to be held, the minimum diameter is selected out of the plural diameters.

As shown in FIG. 1, the proximal end spreading portions 33 spread from a proximal end of the projection portion 31 toward spaces at opposite sides of the projection portion 31 (more specifically, spaces at rectangular side surfaces of the projection portion). The proximal end spreading portions 33 are curved to form convex shapes in a direction toward the inserting section 20. It should be noted that the proximal end spreading portions 33 are not limited to the curved shapes and that the spreading portions 33 may merely spread toward the opposite side of the projection portion 31 (for example, the spreading portions may be flat plate-like shapes).

The distal end spreading portions 32 and proximal end spreading portions 33 are faced toward one another at the opposite ends of the projection portion 31 and have the same lengths in their spreading directions. Thus, as described below, it is possible for the distal end spreading portions 32 and proximal end spreading portions 33 to clamp the electrical wire bundle 51 in the same contacting manner. However, it should be noted that the distal end spreading portions 32 and proximal end spreading portions 33 do not necessarily have the same lengths in their spreading directions. For example, the lengths of the distal end spreading portions 32 may be longer than those of the proximal end spreading portions 33.

Thus, in the holding section 30, the distal end spreading portions 32 and proximal end spreading portions 33 are disposed in symmetry with respect to a plane including the central axis of the projection portion 31. That is, the distal end spreading portions 32 spread to define the same curved shapes at the opposite sides of the projection portion 31.

Figure 3:
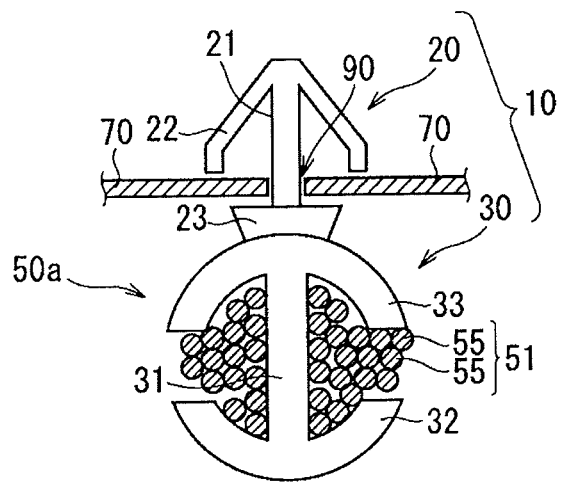
FIG. 3 is a cross section view of a wire harness equipped with a clip.

FIG. 3 shows a cross section of the wire harness 50a equipped with the clip 10 mounted on the electrical wire bundle 51. FIG. 3 is a cross section view perpendicular to an extending direction of the wire harness 50a. In the wire harness 50a equipped with the clip 10 in the present embodiment, the distal end spreading portions 32 of the clip 10 penetrate the electrical wire bundle 51 and the projection portion 31 is embedded in the electrical wire bundle 51. That is, all of electrical wires 55 that constitute the electrical wire bundle 51 are disposed between the distal end spreading portions 32 and proximal end spreading portions 33. More specifically, the electrical wires 55 are disposed in two spaces defined by the rectangular surfaces of the projection portion 31, inner surfaces of the distal end spreading portions 32, and inner surfaces of the proximal end spreading portions 33. At least one of electrical wires 55 can be disposed in each of the two spaces. The projection portion 31 can restrain the electrical wire bundle 51 from shifting in a width direction perpendicular to the projecting direction of the projection portion 31.

To obtain the wire harness 50a equipped with the clip 10, the clip 10 is attached to the electrical wire bundle 51 by the following manner. Firstly, the spreading direction of the distal end spreading portions 32 is set to be a direction perpendicular to the extending direction of the electrical wire bundle 51 and the distal end spreading portions 32 are pushed into the electrical wire bundle 51 so as to divide the bundle 51. Although a position where the clip 10 is pushed into the electrical wire bundle 51 may be any position so long as the clip 10 is pushed into a side surface of the electrical wire bundle 51, it will be preferable that the projection portion 31 of the clip 10 to be pushed into the electrical wire bundle 51 is set to be a position where the projection portion 31 divides the electrical wire bundle 51 into half parts approximately.

When the clip 10 is pushed into the electrical wire bundle 51, free ends of the distal end spreading portions 32 are slightly deflected in a direction toward the projection portion 31. The distal end spreading portions 32 are curved in the convex shapes in a direction of the distal end of the projection portion 31. Thus, while the electrical wires 55 are divided toward the free ends on the both ends of the distal end spreading portions 32 along the outer surfaces of the distal end spreading portions 32, the distal end spreading portions 32 are pushed into the electrical wire bundle 51. When the distal end spreading portions 32 penetrate the electrical wire bundle 51, the free ends of the distal end spreading portions 32 return to original spreading positions. Consequently, the inner surfaces of the distal end spreading portions 32 contact with the outer surface of the electrical wire bundle 51.

A pushing action of the clip 10 into the electrical wire bundle 51 is restrained when the proximal end spreading portions 33 contact with the electrical wire bundle 51. Accordingly, the electrical wire bundle 51 of the wire harness 50a equipped with the clip 10 are clamped and held between the distal end spreading portions 32 and the proximal end spreading portions 33. Thus, the clip 10 is mounted on the electrical wire bundle 51.

Figure 4:
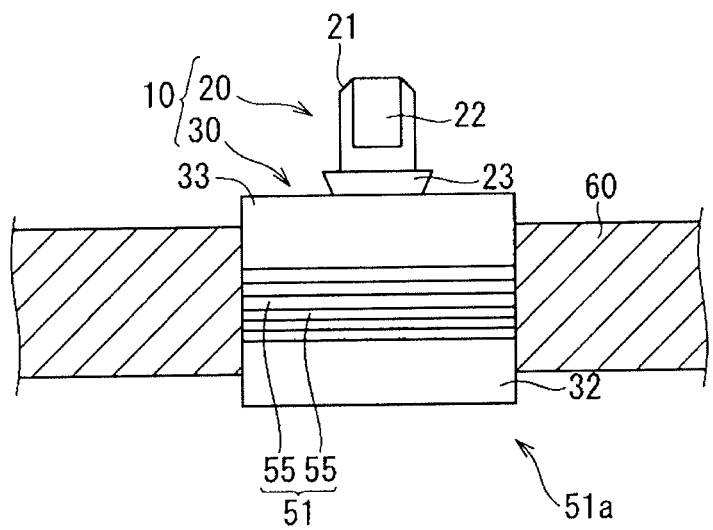
FIG. 4 is a front elevation view of the wire harness equipped with the clip.

FIG. 4 shows a front elevation view of the wire harness 50a equipped with the clip 10. Tapes 60 are wound around the electrical wire harness 50a at the opposite sides of the clip 10. Thus, the clip 10 can be restrained from shifting on the electrical wire bundle 51 in the extending direction of the bundle 51. That is, the positioning of the clip 10 can be effected in the extending direction of the electrical wire bundle 51. Since the clip 10 includes the distal end spreading portions 32, it is possible to restrain the clip 10 from falling down from the electrical wire bundle 51. Accordingly, it is not necessary to wind the tape onto the clip 10, for example, by a cross-winding manner of the tape. Thus, a complicated tape-winding work is not required and it is possible to restrain the cross-winding tape 60 from being caught by the inserting section 20, thereby obtaining a positive contact between the vehicle body and the clip 10. Since the tape cross-winding work is not required, it is possible to reduce a cost of the tape.

A plurality of kinds of clips 10 including the holding section 30 that comprises the projection portion 31, distal end spreading portions 32, and proximal end spreading portions 33 are prepared. The portions 31, 32, and 33 have different lengths from one another. Thus, the clip 10 can be selectively used in accordance with the diameter in cross section of the electrical wire bundle 51.

Figure 5:
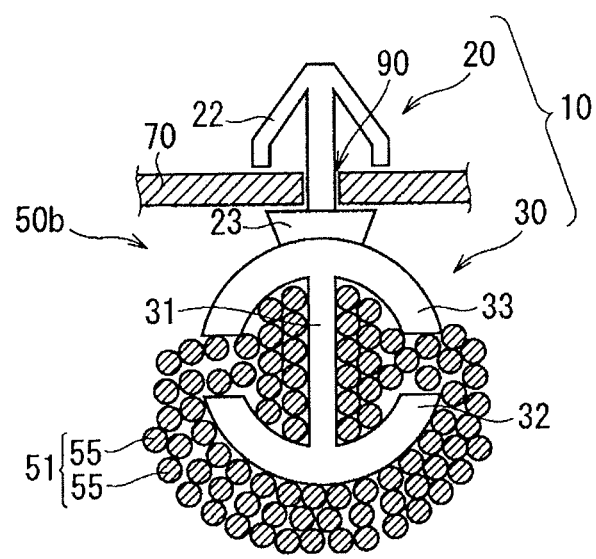
FIG. 5 is a cross section view of the wire harness equipped with the clip.

Since kinds of parts will be increased if the plural kinds of clips 10 are prepared, a single kind of clip 10 may hold the electrical wire bundle 51 having plural different diameters. In this case, the clip 10 mounted on the electrical wire bundle 51 does not need to bring the inner surface of the distal end spreading portions 32 into contact with the outer surface of the electrical wire bundle 51. The distal end spreading portions 32 of the clip 10 mounted on the electrical wire bundle 51 may be embedded in the bundle 51. That is, if the clip 10 is attached to the electrical wire bundle 51 that has a diameter in cross section greater than a length of the projection portion 31 in its extending direction, the distal end spreading portions 32 of the clip 10 are embedded in the electrical wire harness 50b equipped with the clip 10, as shown in FIG. 5. Then, the tapes 60 are wound around the electrical wire bundle 51 at the opposite sides of the clip 10. Thus, it is possible to restrain the clip 10 from shifting in the extending direction of the electrical wire bundle 51.

As described above, the holding section 30 of the clip 10 in the present embodiment has the distal end spreading portions 32 that spread from the distal end of the projection portion 31 toward opposite sides of the portion 31 and that are curved in the convex shapes in the distal end of the projection portion 31 as a whole. When such clip 10 is attached to the electrical wire bundle 51, the distal end spreading portions 32 are embedded in the electrical wire bundle 51, or the portions 32 contact with the outer peripheral surface of the bundle 51, thereby restraining the clip 10 from falling down from the bundle 51.

The distal end spreading portions 32 are curved in the convex shapes in the distal end direction of the projection portion 31. Accordingly, when the clip 10 is mounted on the electrical wire bundle 51, the clip 10 is readily pushed into the electrical wire bundle 51 and the clip 10 can be easily attached to the electrical wire bundle 51.

Furthermore, since the distal end spreading portions 32 are curved to define the convex shapes in the distal end direction of the projection portion 31, the distal end spreading portions 32 can be disposed along the outer periphery of the electrical wire bundle 51, even if the distal end spreading portions 32 protrude outward from the outer periphery of the electrical wire bundle 51. Thus, it is possible to reduce a protruding amount of the clip 10 from the electrical wire bundle 51 to as small as possible. Accordingly, when the wire harness 50a equipped with the clip 10 is arranged in the motor vehicle, it is possible to prevent the distal end spreading portions 32 of the clip 10 from blocking the wire harness 50a.

The holding section 30 of the clip 10 in the present embodiment includes the proximal end spreading portions 33. Accordingly, the electrical wire bundle 51 held by the holding section 30 of the clip 10 is positioned in the extending direction of the projection portion 31 by the proximal end spreading portions 33. Thus, it is possible to restrain the inserting section 20 from being embedded in the electrical wire bundle 51. Consequently, it is possible to prevent a connection between the inserting section 20 and the vehicle body from being incomplete and it is also possible to prevent the inserting section 20 from falling down from the electrical wire bundle 51 in the embedding direction into the bundle 51.

The proximal end spreading portions 33 are curved in the convex shapes in the direction toward the inserting section 20. Thus, even if the proximal end spreading portions 33 protrude from the outer periphery of the electrical wire bundle 51, it is possible to arrange the proximal end spreading portions 33 along the outer periphery of the electrical wire bundle 51. Consequently, it is possible to reduce a protruding amount of the proximal end spreading portions 33 to as small as possible.

The distal end spreading portions 32 spread at the opposite sides of the projection portion 31 to define the same curved shapes. Accordingly, since the holding section 30 has a good balance with respect to the projection portion 31, it is possible for the distal end spreading portions 32 to stably support the divided electrical wire bundle 51 at the opposite sides of the projection portion 31. More specifically, the electrical wire bundle 51 is supported by the distal end spreading portions 32 that spread toward the spaces at one side and the other side of the projection portion 31. Thus, the pushing force can be uniformly applied to both distal end spreading portions 32 with respect to the projection portion 31 in comparison with the case where the distal end spreading portion extends in only one space with respect to the projection portion. Accordingly, it is possible to restrain the projection portion from inclining. A length of each distal end spreading portion 32 in its spreading direction becomes a half of a length of the distal end spreading portion that extends in only the single space.

Consequently, it is possible to restrain the distal end spreading portions 32 from being deformed. As described above, the electrical wire bundle 51 will hardly come out from the clip 10.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A clip comprising a fixing section configured to be secured to a vehicle body and a holding section configured to hold an electrical wire bundle;
   said holding section including:
   a planar projection portion projecting from the fixing section;
   a pair of opposite facing, arcuate shaped distal end spreading portions that each extend from a distal end of said projection portion toward a proximal end of said projection portion on opposite sides of said projection portion, said distal end spreading portions being curved in convex shapes in a distal end direction of said projection portion as a whole; and
   a pair of opposite facing, arcuate shaped proximal end spreading portions that each extend from said proximal end of said projection portion toward said distal end of said projection portion on said opposite sides of said projection portion.

2. A clip according to claim 1, wherein said distal end spreading portions extend in the same curved shapes on the opposite sides of said projection portion.

3. A clip according to claim 2, wherein said proximal end spreading portions are curved in convex shapes in a direction toward said fixing section.

4. A clip according to claim 3, wherein said proximal end spreading portions extend in the same curved shapes on the opposite sides of said projection portion.

5. A wire harness equipped with a clip, comprising:
   a wire harness including an electrical wire bundle that binds a plurality of electrical wires; and
   a clip according to claim 1 mounted on said electrical wire bundle.

6. A wire harness equipped with a clip according to claim 5,
   wherein an extending direction of said electrical wire bundle is perpendicular to a spreading direction of said distal end spreading portions; and
   wherein said distal end spreading portions are embedded in said electrical wire bundle.

7. A wire harness equipped with a clip according to claim 5, wherein an extending direction of said electrical wire bundle is perpendicular to a spreading direction of said distal end spreading portions; and wherein said distal end spreading portions contact with an outer periphery of said electrical wire bundle.

* * * * *